Figure 7:
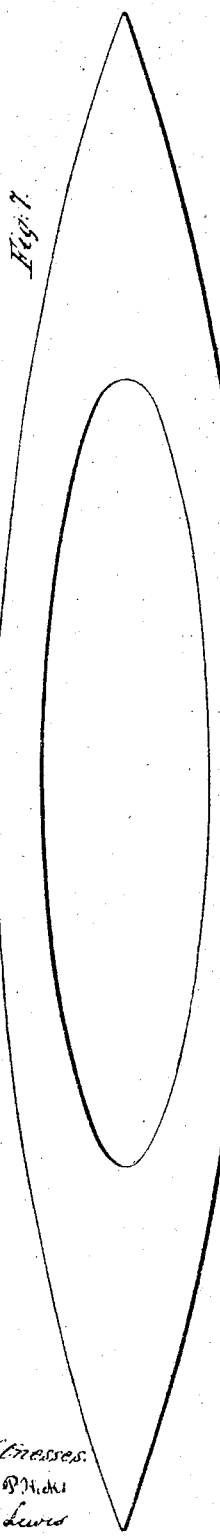

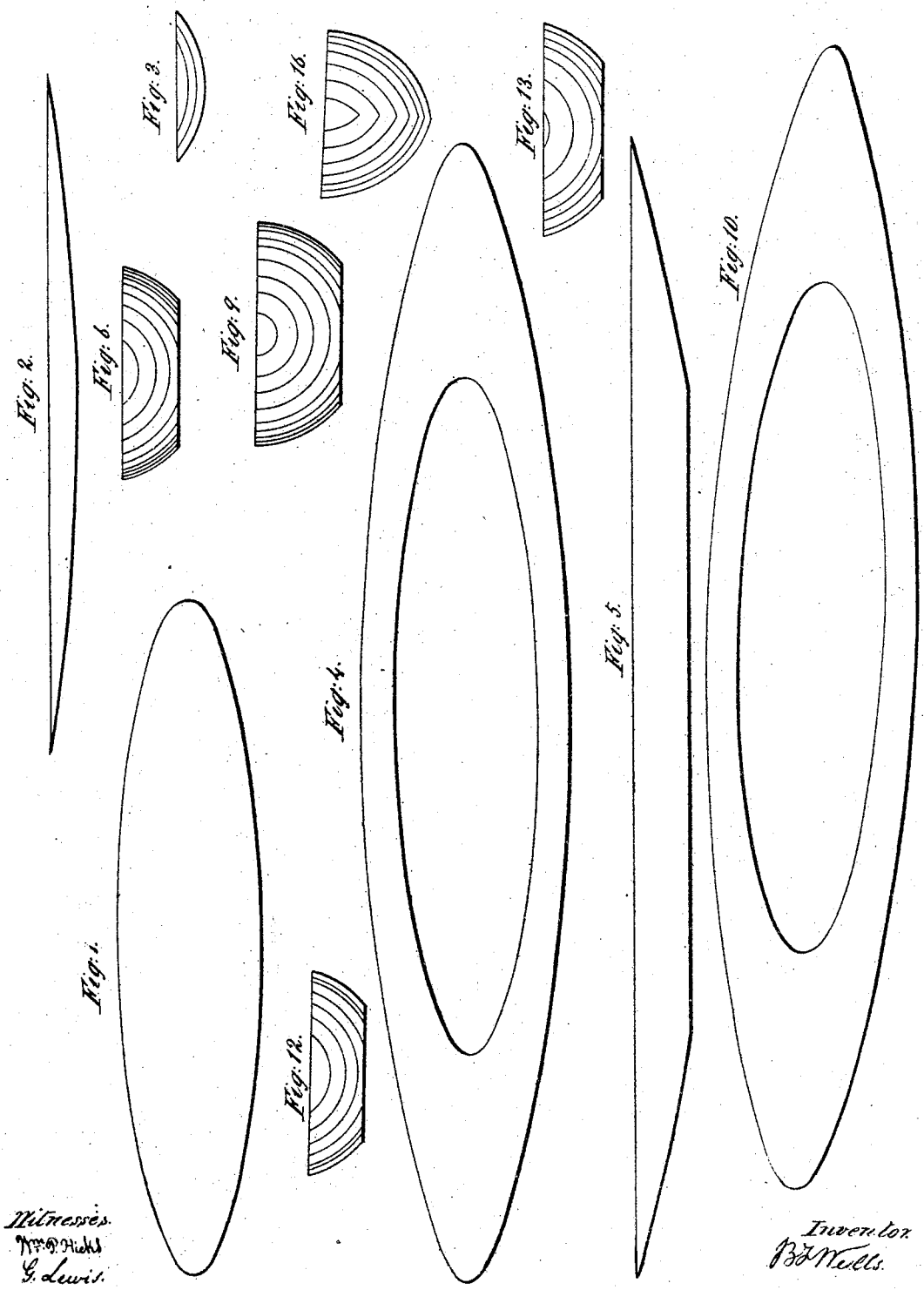

B. F. Wells.
Ship Form.
N°25,857. Patented Oct.18,1859.

Witnesses.
W. P. Hicks
G. Lewis

Inventor.
B. F. Wells

UNITED STATES PATENT OFFICE.

BENJAMIN F. WELLS, OF GEORGETOWN, DISTRICT OF COLUMBIA.

NAVAL ARCHITECTURE.

Specification of Letters Patent No. 25,857, dated October 18, 1859.

*To all whom it may concern:*

Be it known that I, BENJAMIN F. WELLS, of Georgetown, in the District of Columbia, have invented a new and useful Mode of Modeling Boats and other Vessels; and I do hereby declare the following to be a correct description of the same, reference being had to the accompanying drawings, and the letters of reference marked thereon.

My invention consists in giving the model or shape to vessels by means of drafts prepared entirely by the compass or slide rule without the use of solid models or molds, by reason of the lines being all arcs of circles or derived from a solid whose outlines are arcs of circles. The fundamental figure from which my lines are derived is a spindle formed by the revolution of a circular arc around its chord. All the lines in my models can be obtained from sections of such a spindle by a plane parallel with its axis, or inclined to the axis. When the bow and stern are to be alike in model, the plane will cut the spindle either directly through the axis, or parallel with it. When there is to be a difference in the model of the forward and after parts of the vessel, the plane of section will have more or less inclination to the axis of the spindle. Variations of form may also be produced by uniting various symmetrical parts of the spindle as hereinafter more particularly set forth.

In the present mode of modeling boats and other vessels, it is usual to prepare a solid model the form of which is varied according to the fancy of the builder or the particular views he may entertain of the requirements of the vessel in view of the purpose for which she is intended. Hence models are as various as vessels are numerous, scarcely any two being constructed on precisely the same lines, or the same theory. There is no rule or principle which can be distinctly communicated or followed; the eye is the chief guide in shaping the model, and when its form is satisfactory to the builder, its lines are laid down by means of sections, transferred on full scale to the molding floor, and the molds prepared from them as guides for the preparation of the timbers. The necessity for a model arises from the irregularity of the form adopted. A regular solid, such as a circular spindle of known dimensions, or any definite part of such a solid, can be reproduced by measurement alone, without the intervention of a model; and I have found that such a solid contains all the elements necessary to the production of boats of all dimensions, and of every variety of speed, draft, and stability.

In the drawings I have shown the lines of a variety of boats and vessels modeled on my principle, and I will now proceed to give their dimensions. I do not however desire to confine myself to any particular dimensions as a circular spindle of any size or proportions may be employed from which to derive the lines required. The examples given in the drawings are of the portion of the vessel below the water line, the upper portion being left entirely to the fancy of the builder. The drafts are made on a scale of ¾ of an inch to the foot, and all the models here given are derived from a spindle 48 feet long and 8 feet in diameter.

Figure 1 shows the water line of boat No. 1. Fig. 2 a side view of the same and Fig. 3 an end view. This boat is 24 feet 6 inches long and 5 feet 4 inches wide on the water line, and 12 inches deep. The ends are symmetrical the plane of section being parallel to the axis of the spindle.

Fig. 4 shows the water line and bottom line of a flat bottomed boat which I call boat No. 2. Fig. 5. is a side view of the same and Fig. 6. an end view. This boat is 41 ft. 4 in. long and 7 ft. 8 inches wide on the water line and 24 inches deep. The bottom is 24 ft. 6 inches long and 5 feet 4 inches wide. The plane of section is parallel to the axis, and the ends are consequently symmetrical.

Figure 8:
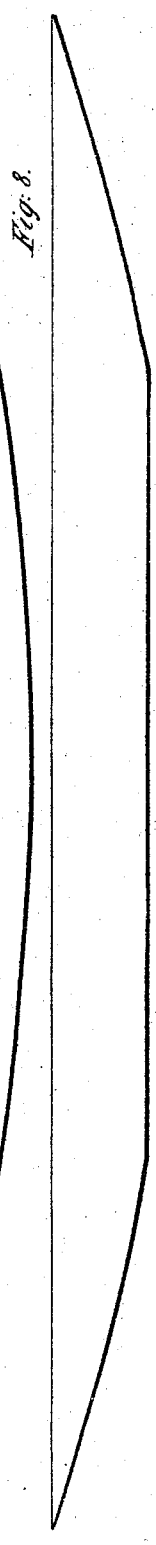

Fig. 7 shows the water and bottom lines of a flat bottomed boat which I shall designate as Boat No. 3. Fig. 8 is a side view, and Fig. 9, an end view of the same. This vessel is 48 feet long and 8 feet wide at the water line, said line being obtained by a section through the axis of the spindle. The bottom is of the same dimensions as that of Boat No. 2. The ends are symmetrical. The depth is 36 inches.

Figure 11:
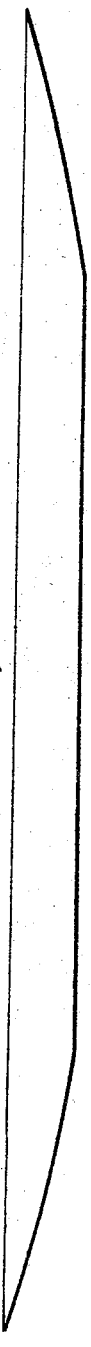

Fig. 10 shows the water and bottom lines of a flat bottomed boat, which I denominate Boat No. 4. Fig. 11 is a side view of the same. Fig. 12 is a transverse section of the forward end, and Fig. 13 a similar section of the after end of the same. The plane of section in this case is inclined to the axis of the spindle, and hence the ends of the boats are not symmetrical, the greatest width being abaft the center and the lines forward being finer than those aft. The bottom plane being parallel to the plane of the water line, has a corresponding shape. This vessel is 41 ft. 6 inches long, and 7 feet 8 inches wide at water line and 24 inches deep.

Figure 14:
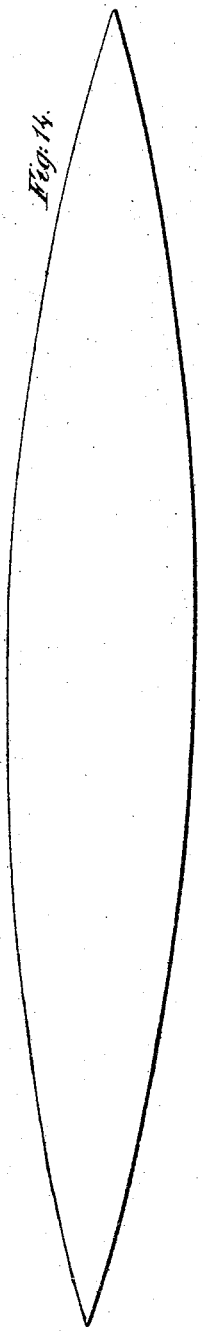
Figure 15:
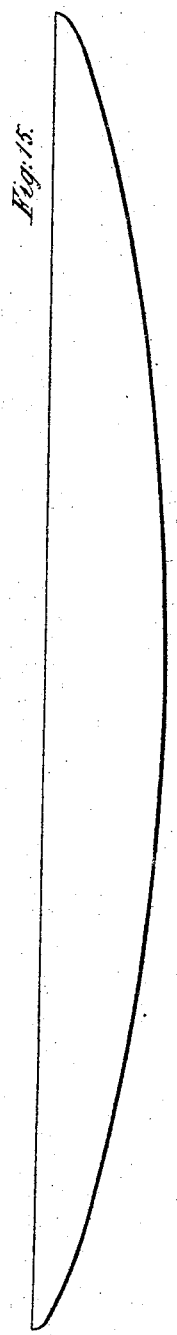

Fig. 14 shows the water line of a seagoing vessel which I call vessel No. 5. Fig. 15 is a side view, or central longitudinal section, and Fig. 16, an end view of the same. This vessel is formed by combining two symmetrical portions of the spindle obtained as follows:—The spindle being bisected, the parts to be combined are obtained from the half spindle by cutting them off by a plane at right angles to the bisecting plane and parallel with the axial line, and at equal distances from it. The two portions thus cut off will exactly correspond in their plane surfaces, and when united will give the model of vessel No. 5, which has greater proportional depth and less beam than those previously described.

I have described these various forms of hull to show some few of the applications of the principle of my invention. By changing the dimensions and proportions of the original spindle endless varieties of form can be derived without changing the mode of operation hereinbefore laid down.

Having thus described my invention and various examples of its practical application, what I claim, and desire to secure by Letters Patent, is—

Deriving the lines of vessels of all kinds and dimensions, from sections of a circular spindle of any dimensions or proportions, substantially as described and shown.

The above specification signed and witnessed this 4th day of October A. D. 1859.

B. F. WELLS.

Witnesses:
CHAS. F. STANSBURY,
EDM. F. BROWN.